United States Patent [19]
Franz et al.

[11] 4,043,386
[45] Aug. 23, 1977

[54] ENERGY RECOVERY FROM GEOTHERMAL RESERVOIRS

[75] Inventors: William F. Franz, Gardiner; Howard V. Hess, Glenham, both of N.Y.

[73] Assignee: Texaco Inc., New York, N.Y.

[21] Appl. No.: 582,330

[22] Filed: May 30, 1975

[51] Int. Cl.² ............................................. F03G 7/00
[52] U.S. Cl. ....................................... 165/45; 60/641
[58] Field of Search .................... 165/45, 107, 111; 60/641; 122/31 R

[56] References Cited
U.S. PATENT DOCUMENTS
| | | | |
|---|---|---|---|
| 3,386,502 | 6/1968 | Rostaing | 165/111 |
| 3,845,627 | 11/1974 | Hutchinson | 60/641 |

FOREIGN PATENT DOCUMENTS
| | | | |
|---|---|---|---|
| 1,523,211 | 3/1968 | France | 165/107 |
| 821,003 | 9/1959 | United Kingdom | 165/107 |

*Primary Examiner*—Allen M. Ostrager
*Attorney, Agent, or Firm*—Thomas H. Whaley; Carl G. Ries; Walter D. Hunter

[57] ABSTRACT

A method for recovering energy from a geothermal reservoir in which brine from the reservoir is first employed to heat an immiscible fluid, such as a hydrocarbon in direct heat exchange and the heated hydrocarbon is then utilized in direct heat exchange to heat a second fluid, such as boiler feed water, to raise steam as the actual working fluid in the power cycle.

8 Claims, 1 Drawing Figure

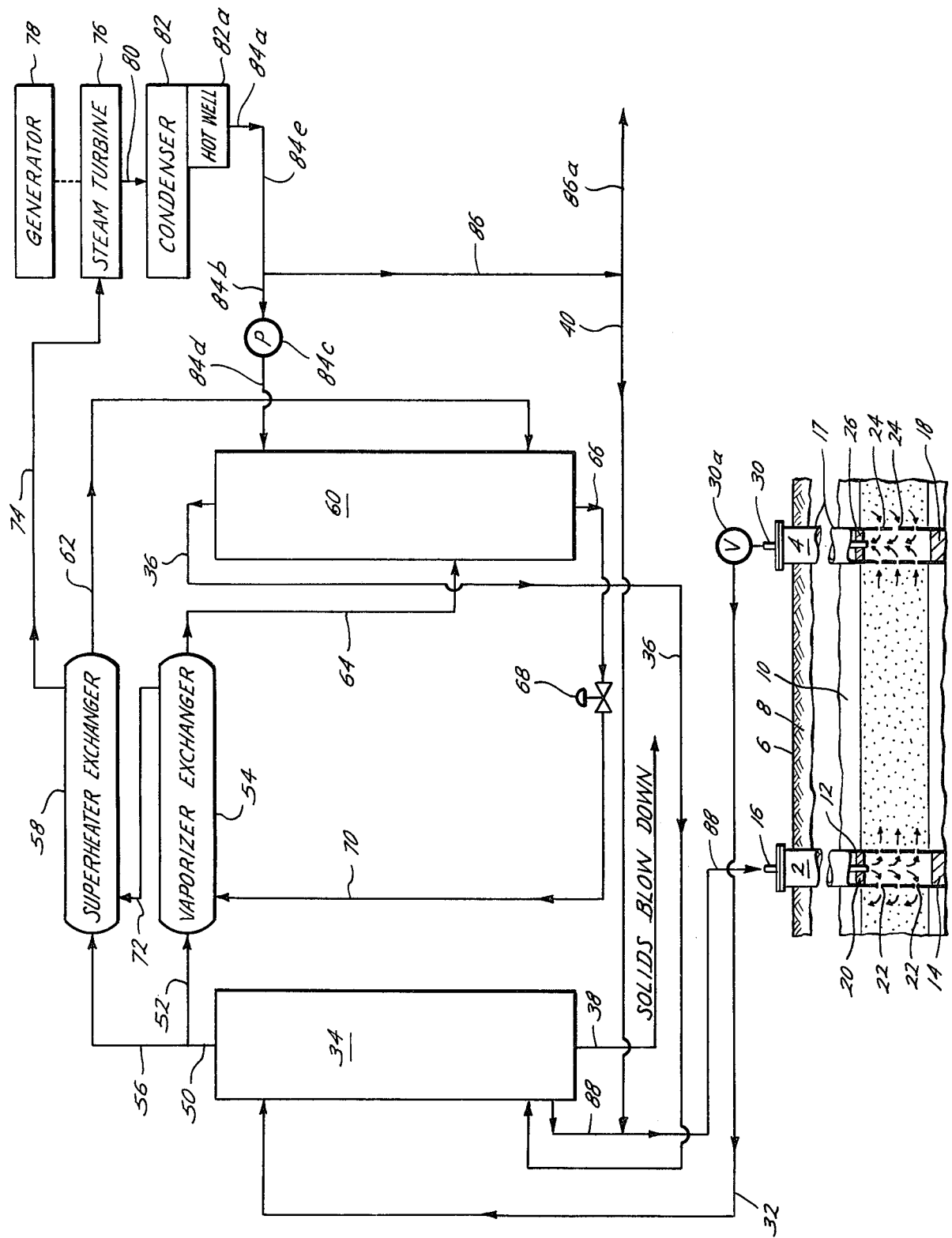

ENERGY RECOVERY FROM GEOTHERMAL RESERVOIRS

BACKGROUND OF THE INVENTION

1. FIELD OF THE INVENTION

This invention relates to a method of recovering energy from a geothermal reservoir wherein direct heat exchange an immiscible fluid, such as a hydrocarbon, is heated by direct contact with geothermal brine in a second step the heated hydrocarbon is employed in direct heat exchange to heat a second working fluid, such as boiler feed water, to form steam.

2. DESCRIPTION OF THE PRIOR ART

Atmospheric pollution by-products of combustion and thermal pollution by waste heat rejected to rivers and streams complicate the design and operation of fossil fueled power plants. Even nuclear plants, with their inherently higher levels of heat rejection and consequent thermal pollution as well as the ever-present radiation hazard, do not hold promise of providing a source of power free of environmental degradation. Recently, however, geothermal energy has come into prominence as a power source for generating electrical energy with minimal ecological impact. While this energy source cannot be looked to for a solution of the present energy crisis, its utilization would reduce to some extent the environmental degradation resulting from conventional plants.

Although a highly desirable power source, only limited use of geothermal energy is being made at the present time. In the United States, only the Geysers Field north of San Francisco, Calif. is presently being used for commercial power generation. Geological structures making accessible the internal heat energy of the earth are not nearly so rare as would be indicated by the present day usage pattern. Rather, it is the stringent requirements placed on the types of reservoir which may be utilized by application at present technology which has precluded widespread development of the many known areas of geothermal activity. Commercial development has been limited to reservoir in which the heat energy is available in the form of dry steam. In many of the known reservoirs, the heat energy is present in the form of a hot brine solution under sufficient formation pressure to maintain the liquid phase. Depending on reservoir configurations, there may or may not be a steam cap associated with the brine. To date, it has not been feasible to utilize these reservoirs. Direct flashing of hot produced brine has not proven practical because of the severe limitations it places on the energy available in the steam so produced. Indirect heat exchange of the brine against boiler feed water to raise steam would be plagued with exchanger fouling on the brine side at the tubes. Producing steam from the vapor phase section of the reservoir would deplete, at least locally, the water in the brine liquid and precipitate dissolved salts. The precipitated solids would quickly plug the formation, shutting off flow to the producing well.

There is a definite need in the art, therefore, for a process for recovering energy from a geothermal brine in which the brine recovered from the formation after recovery of energy therefrom by a method in which heat exchange surfaces are not fouled by precipitated solids can be returned to the formation so that the reservoir fluids are not depleted.

SUMMARY OF THE INVENTION

In one aspect this invention relates to a process for recovering heat from a hot geothermal brine which comprises:

a. passing the hot brine in direct countercurrent contact with a relatively cool hydrocarbon liquid in a first heating zone whereby the said brine is cooled and the said hydrocarbon liquid is heated to an elevated temperature under sufficient pressure to maintain the said brine and said hydrocarbon in liquid phase, b. withdrawing the said heated hydrocarbon liquid from the first heating zone and passing it in direct countercurrent heat exchange with water in a final second heating zone whereby the said hot hydrocarbon liquid is cooled and the said water is heated to an elevated temperature and pressure and wherein step (b) is carried out under sufficient pressure to maintain the hydrocarbon and water in the liuqid phase, and c. withdrawing the said heated water from the said second heating zone.

The water heated to an elevated temperature and pressure may be employed for a variety of heating requirements in process operations. For example, the heated water may be utilized in indirect heat exchange to heat refinery feed stocks, etc. Alternatively, the heated water withdrawn from step (b) above, may be passed through a pressure letdown valve thus forming steam useful in power generation in low pressure turbines or for a variety of other process heating operations.

Generally the temperatures of the hot incoming brine will vary from about 400° to about 750° F. In the first heating zone the relatively cool hydrocarbon liquid will be heated to a temperature of from 400° to about 700° F. and the pressure maintained in the first heating zone which must be sufficient to maintain the brine and hydrocarbon in liquid phase, will vary from about 250 psi to about 3300 psi. In the second heating zone the water will usually be heated from about 100° to about 600° F. while the pressure in the second heating which must be sufficient to maintain the hydrocarbon and water in liquid phase will range from about 250 psi and to about 1600 psi.

DETAILED DESCRIPTION OF THE INVENTION

In the process of this invention a direct heat exchange system is utilized which overcomes the difficulties encountered in conventional systems for recovering energy from geothermal brines. Heat contained in the provided brine is transferred to an immiscible fluid, such as a hydrocarbon fraction as exemplified by kerosene, naphtha gasoline, virgin gas oil, FCCU cycle gas oil, lubricating oils, etc. with no intervening heat transfer surfaces to be fouled by salts coming out of solution. The heated hydrocarbon, or other suitable fluid, is then exchanged against boiler feed water to raise steam as the actual working fluid in the power cycle. In this manner, the power cycle working fluid of this invention becomes completely independent of the fluid produced from the geothermal reservoir and it becomes practical then to extract useful energy from any type of reservoir. Temperature of the formation fluid becomes the only consideration. A wide variety of hydrocarbons are useful in the process of invention. Normally liquid hydrocarbons are generally suitable for use in this process including hydrocarbons having 6 to 30 carbon atoms per molecule and preferably 9 to 12 carbon atoms. Examples of the various hydrocarbon types which can be employed in this process include aliphatic hydrocarbons, such as hexane, 2,3-dimethylbutane, heptanes, octanes, isooctane, nonanes, decanes, propylene tetramer, hexadecane, 2-methyl1-pentene, etc. alicyclic hydrocarbons as exemplified by methylcyclopentane, cyclohexane, dimethylcyclohexane, ethylcyclohexane, tetralin, isoporpylcyclohexane, pinene, etc. and aromatic hydrocarbons such as benzene, cumene, xylenes, methylnaphthalenes, etc.

The preferred hydrocarbons include those that are stable under the temperatures and pressures utilized in the process, for example 100° to about 600° F and 250 psi to about 3300 psi. Likewise, the preferred hydrocarbons are those having low toxicity and low solubility in water at ordinary temperatures and atmospheric pressure. Saturated hydrocarbons are preferred for use in this process.

Additional preferred petroleum fractions useful in the process of this invention include normal paraffin hydrocarbons having 10 to 12 carbon atoms per molecule, e.g., the bottoms fraction obtained from the alkylation of butylenes with isobutane; aromatic hydrocarbons of 9 to 10 carbon atoms per molecule as exemplified by aromatic hydrocarbons obtained by alkylation of benzene or toluene with propylene; propylene tetramer; a gasoline fraction containing hydrocarbons of 10 to 12 carbon atoms per molecule and naphthalenes containing 9 to 10 carbon atoms per molecule.

To illustrate the generation of such a system, one possible flow which might be used is shown in FIG. 1. In the figure there are shown injection well 2 for reintroducing brine into the geothermal formation and production well 4 which are 110 feet apart and which extend from the surface of the earth 6 down to the upper formation 8 into a geothermal formation 10 having associated with it brine and exhibiting a temperature of about 550° F. Well 2 is cased with steel pipe casing 12 and the bottom of the well is plugged back with a suitable cement layer or plug 14. The 20 foot interval (7210-7230 feet) above plut 14 of casing 2 is perforated in a conventional manner to form a fluid passage way between the wellbore and formation 10 via perforations 22. Steel tubing 16 is installed in the wellbore to a point about 20 feet above plug 14 where it passes through packer 20.

Well 4 is cased with steel pipe casing 17 and the bottom of this well is plugged back with a suitable cement layer 18. Both wells 2 and 4 are completed at the same depth in the geothermal formation. The 20 foot interval above plug 18 of casing 16 is perforated in a conventional manner to form a fluid passageway between the wellbore and formation 10 via perforations 24. Steel tubing 30 is installed in the wellbore of well 4 to a point about 20 feet above plug 18 it passes through packer 26.

The geothermal formation in both the well employed for reinjecting the brine as well as the brine production well is hydraulically fractured. Injection well 2 is prepared for hydraulic fracturing in the usual manner and fracturing is accomplished by injecting via a steel pipe casing 12 and into the formation through casing perforation 22, 23,000 gallons of fresh water gelled with guar gum and containing 1.3 lbs. per gallon of sand grains suitably sized. The fracturing fluid is injected into the formation at a rate of 33 barrels per minute of 4000 psig (maximum). The brine production well 4 is hydraulically fractured in the same manner employing the same type of fracturing fluid.

Produced brine is withdrawn from the well-head of production well 4 penetrating the geothermal formation at a temperature of 550° F. and at a pressure sufficient to maintain it in the liquid phase. The hot brine is passed through valve 30a and is conducted via line 32 to the top of heat exchange 34 and exchanged against kerosene. Kerosene at 120° F. is passed into the bottom of heat exchanger 34 via line 36. Any dissolved solids which precipitate from the brine as it is cooled are removed from the system by periodic blow down via line 38. Brine leaving the exchanger 34 via line 88 is conducted to injection well 2 for reinjection into the formation via tubing 16. Kerosene heated to a temperature of about 530° F. is withdrawn from the top of heat exchanger 34 via line 50 and split into two streams. The largest portion (about 80% by volume) of the hot kerosene is passed via line 52 through vaporizer exchanger 54 where it is cooled in indirect heat exchange from 530° F. to 360° F. The smaller of the hot kerosene streams (about 20% by volume) is passed via line 56 to superheater exchanger 58 where it is cooled in indirect heat exchange from 530° F to about 510° F. The two hydrocarbon streams are then employed to preheat the vaporizer feed water in a second direct heat exchanger 60. The hotter of the two streams, i.e., the superheater exchanger 58 outlet stream, is conducted via line 62 to the preheater direct heat exchanger 60 where it is injected into the preheater at the bottom. The larger volume hydrocarbon stream from vaporizer exchanger 54 is conducted via line 64 where it is injected at an intermediate point above the injection point of the hotter hydrocarbon stream 62 into direct exchanger 60. The cooled hydrocarbon is withdrawn from the top of direct exchanger 60 and transmitted via line 36 to heat exchanger 34 for direct exchange against the incoming hot brine.

Boiler feed water at about 100° F from the power section condenser hot well 82a is passed to the suction side of pump 84c via lines 84a, 84e and 84b and then conducted via line 84d to the top of preheater direct exchanger 60. By direct heat exchange in preheater direct exchanger 60 utilizing the hot hydrocarbon streams the water temperature is raised to about 500° F at about 800 psi. This pressure is sufficient to maintain the water in the liquid phase at the outlet of preheater direct exchanger 60.

The liquid water, at 500° F and 800 psi, is then conducted from the bottom of preheater direct exchanger 60 via line 66 to throttling valve 68 where the pressure is reduced to about 130 psia. During the pressure reduction operation about 18-20 % of the water is vaporized. From the downstream side of throttling valve 68 the wet steam at a temperature of 340° F and 130 psi is conducted via line 70 to the vaporizer indirect exchanger 54 where sufficient heat is added to produce saturated steam at 120 psia (348° F). Saturated steam is withdrawn from the vaporizer exchanger 54 via line 72 and introduced into superheat indirect exchanger 58 where it is superheated to a temperature of 500° F. at 130 psia. The superheated steam is conducted via line 74 to steam turbine 76 which is direct connected to generator 78. Exhaust steam is passed via line 80 to condenser 82. The water leaving condenser 82 passes to condensor hot well 82a and is then passed via line 84a, 84e and 84b to boiler feed water pump 84c. Excess water not required for the preheater direct exchanger 60 is withdrawn from the boiler feed water line via line 86. Excess water may optionally be withdrawn from the system via line 86a or it may be transmitted via line 40 to brine return line 88 by which the brine and excess water are reinjected into the formation via tubing 16.

As previously mentioned the brine cooled in direct exchanger 34 may be reinjected into the producing formation via well 2. Any dissolved solids in the hot brine which may come out of solution as a result of reduction in temperature in direct exchanger 34 are blown down from the system via line 38.

Since many geothermal brines contain potassium chloride as well as other valuable minerals, marketable by-products may be recovered from the blow-down stream. Money derived from the sale of such minerals would make geothermal energy production by the subject process more economically attractive.

In addition to solids precipitated by brine cooling, an additional amount of solids are precipitated due to water removal in the system. At the 550° F inlet temperature of the brine exchanger 34 there is appreciable water solubility in the hydrocarbon. Dissolved water would be released from the hydrocarbon in the downstream exchangers as the hydrocarbon is cooled and these water streams would combine with a boiler feed water in the preheater exchanger 60. Thus make-up boiler feed water would be provided and under certain operating conditions a net blow downstream of fresh water would be available for whatever use might be desired. Further, by proper choice of the hydrocarbon heat transfer medium, water extraction may be maximized to increase production of saleable by-product minerals.

What is claimed is:

1. The process for recovering heat from a hot geothermal brine which comprises:
   a. passing the hot brine in direct countercurrent contact with a relatively cool hydrocarbon liquid (A) in a first heating zone whereby the said brine is cooled and the said hydrocarbon liquid is heated to an elevated temperature under sufficient pressure to maintain the said brine and said hydrocarbon in liquid phase,
   b. withdrawing the said heated hydrocarbon liquid from said first heating zone and passing it through a second heating zone comprising a first and a second indirect heat exchanger, wherein the said heated hydrocarbon withdrawn from the first heating zone is split into two hot hydrocarbon streams of unequal portions, wherein the larger portion hot hydrocarbon stream is passed through the said first indirect heat exchanger in indirect heat exchange with steam whereby the steam is heated to form saturated steam and the said layer portion hot hydrocarbon stream is cooled to form a second hot hydrocarbon liquid (B), and wherein the smaller portion hot hydrocarbon stream is passed through the said second indirect heat exchanger whereby the said saturated steam is heated to form superheated steam and the said smaller portion hot hydrocarbon stream is cooled to form a third hot hydrocarbon stream (C),
   c. withdrawing the said superheated steam from the said second indirect heat exchanger of the second heating zone,
   d. withdrawing from said first indirect heat exchanger the said hot hydrocarbon liquid (B),
   e. withdrawing from said second indirect heat exchanger the said third hot hydrocarbon liquid (C),
   f. passing hot hydrocarbon liquid (B) and hot hydrocarbon liquid (C) through a third heating zone in direct counter-current exchange with water whereby the said hydrocarbon liquids (B) and (C) are intermixed and cooled to form the relatively cool hydrocarbon liquid (A), wherein the said water is heated to an elevated temperature and pressure and wherein the operating step of (f) is carried out under sufficient pressure to maintain the hydrocarbon and water in liquid phase,
   g. withdrawing the said hydrocarbon liquid (A) from the said third heating zone and passing it to the said first heating zone,
   h. withdrawing the said water heated to an elevated temperature and pressure from the said third heating zone and expanding it through a suitable valve whereby steam is formed and passing the said steam to the said second heating zone.

2. The process of claim 1 wherein the larger stream constitutes about 80 percent by volume of the heated hydrocarbon liquid withdrawn from the said first heating zone.

3. The process of claim 1 wherein the temperature of the brine passed into the first heating zone is from about 400° to about 750° F.

4. The process of claim 1 wherein the temperature of the said heated hydrocarbon liquid withdrawn from the first heating zone ranges from about 400° to about 700° F.

5. The process of claim 1 wherein the pressure maintained in the said first heating zone is from about 250 psi to about 3300 psi.

6. The process of claim 1 wherein the pressure maintained in the said second heating zone is from about 250 psi to about 1600 psi.

7. The process of claim 1 wherein the said hydrocarbon liquid is kerosene.

8. The process of claim 1 wherein the hot brine of step (a) in brine withdrawn from the geothermal formation and passed directly to the said first heating zone.

* * * * *